United States Patent
Tsai et al.

(10) Patent No.: US 12,547,662 B1
(45) Date of Patent: Feb. 10, 2026

(54) HOLISTIC DATA MANAGEMENT AND RELATIONSHIP GRAPHS PLATFORM

(71) Applicant: Capital One Services, LLC, McLean, VA (US)

(72) Inventors: Lee Tsai, Williston Park, NY (US); Gregory Bauer, Henrico, VA (US); Moieed Ahmed, Edison, NJ (US); Sunilkumar Krishnamoorthy, Glen Allen, VA (US); Timothy Pappas, Fairfield, CT (US); Azmizar Ujang, Stamford, CT (US); Devarpi Sheth, Chantilly, VA (US); Emmanuel Offiong, Green Brook, NJ (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/066,441

(22) Filed: Feb. 28, 2025

(51) Int. Cl.
*G06F 16/27* (2019.01)
*G06F 11/20* (2006.01)
*G06F 16/25* (2019.01)
*G06F 16/901* (2019.01)

(52) U.S. Cl.
CPC ...... *G06F 16/9024* (2019.01); *G06F 11/2028* (2013.01); *G06F 16/258* (2019.01); *G06F 16/27* (2019.01)

(58) Field of Classification Search
CPC .... G06F 16/9024; G06F 16/27; G06F 16/258; G06F 11/2028
See application file for complete search history.

(56) References Cited

U.S. PATENT DOCUMENTS

| | | | | |
|---|---|---|---|---|
| 12,167,264 | B1* | 12/2024 | McEvilly | H04L 43/0876 |
| 2019/0340273 | A1* | 11/2019 | Raman | G06F 16/184 |
| 2020/0004794 | A1* | 1/2020 | Pal | G06F 16/27 |
| 2022/0121675 | A1* | 4/2022 | Natani | G06F 21/6218 |
| 2024/0241863 | A1* | 7/2024 | Funasaki | G06F 16/17 |
| 2025/0258685 | A1* | 8/2025 | Crabtree | A63F 13/40 |
| 2025/0258695 | A1* | 8/2025 | Iyer | G06F 11/1451 |
| 2025/0273308 | A1* | 8/2025 | Williams | G16H 10/60 |

OTHER PUBLICATIONS

Hendler, James. "Data integration for heterogenous datasets." Big data 2.4 (2014): 205-215. (Year: 2014).*

(Continued)

*Primary Examiner* — Mohsen Almani
(74) *Attorney, Agent, or Firm* — Banner & Witcoff, Ltd.

(57) ABSTRACT

Systems, methods, and apparatuses are described for providing a holistic data management platform. A computing device may receive different sets of data from different third-party data providers. The computing device may then process that data and store it in a distributed database. That data may be encrypted and/or tokenized. A relationship graph may be generated by processing entities indicated in the stored data. For instance, a relationship type may be identified based on properties of entities indicated by different sets of data stored in the distributed database. That relationship graph may be stored and updated based on new data. A failover of a primary cluster of the distributed database my cause performance of an automatic detach-and-promote process, whereby the relationship graph may be provided by a promoted secondary cluster.

20 Claims, 6 Drawing Sheets

(56) References Cited

OTHER PUBLICATIONS

Chandavarkar, B. R., and Sagar Khatri. "Heterogeneous data format integration and conversion (HDFIC) using machine learning and IBM-DFDL for IoT." Evolving Systems 15.2 (2024): 375-396. (Year: 2024).*

Rozony, Farhana Zaman, et al. "A systematic review of big data integration challenges and solutions for heterogeneous data sources." Academic Journal on Business Administration, Innovation & Sustainability 4.04 (2024): 1-18. (Year: 2024).*

* cited by examiner

HOLISTIC DATA MANAGEMENT AND RELATIONSHIP GRAPHS PLATFORM

FIELD OF USE

Aspects of the disclosure relate generally to data management. More particularly, aspects described herein describe a process for receiving data from different sources, managing it in a distributed database, providing both relationship graphs, and addressing cluster failure.

BACKGROUND

Enterprises may receive and store data from a variety of sources. For example, an enterprise may maintain a database that stores information from a variety of different websites, with each website providing data in a different format. This can create numerous issues: for example, it often means that individuals in those organizations need to develop programs and/or processes to standardize and collect the data in a usable way, which can be cumbersome and time-consuming. That said, in many cases, the data itself cannot be changed or reformatted due to security limitations, agreements with third parties (e.g., regarding compatibility), and the like. More broadly, particularly when the data is significantly different, it can make understanding that data difficult: for example, even if the data corresponds to the same entity (e.g., a single customer performing actions on different websites), it can be difficult to connect such activity, visualize it, and make decisions on it.

The aforementioned issues become a particular problem when cluster failure is involved. Recognizing the above problems regarding different sources of data, some organizations purport to simply keep different sets of data received from different third parties separate (e.g., in wholly separate databases). This can present unique issues: for example, if one of the databases storing the data fails, even when redundancies are taken into account, it can be extremely difficult to maintain data uptime and maintain relationships between separate sets of data. After all, the complexity of such systems and their relationships be a hindrance when clusters fail.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein relate to providing a holistic data management platform that can receive various sets of data, store them after processing, identify relationships in the data, generate relationship graphs based on the data, and maintain the availability of such relationship graphs despite cluster failure in a distributed database. As will be detailed further below, different sets of data might be received from a wide variety of different third-party data providers in different formats. For example, a first third-party data provider might provide online shopping activity data in a first format, whereas a second third-party data provider might provide social network activity data in a second format. Those formats might be different in terms of structure (e.g., MySQL data versus Extensible Markup Language (XML) data), might relate to wholly different information (e.g., past purchases, online posts), might refer to the same entity in different ways (e.g., the legal name of a user for a purchase, a username for a social network), and generally might not be easily correlated with one another. That data may be processed and stored in a distributed database. Then, a process may be performed to generate a relationship graph by, among other things, determining a relationship type between two entities indicated in two different processed sets of data. For example, processing may indicate that the processed first data indicates a human (e.g., John Smith) that is associated with a username on a social media platform (e.g., john_smith_3), and a relationship graph might be generated and output on that basis. With that said, the downtime of a cluster (e.g., a cluster failing) might cause issues, as it may be difficult to maintain and update that relationship graph, even when redundancies are taken into account. As such, upon failure of a primary cluster, a detach-and-promote failover process might be used to preserve the availability of the relationship graph. For instance, a secondary cluster may be promoted and used to provide access to the relationship graph.

More particularly, a computing device may receive, from a first third-party data provider, first data in a first format and may receive, from a second third-party data provider, second data in a second format. Those data providers need not be the same: for example, the first third-party data provider may comprise a customer relations management platform, and the second third-party data provider may comprise a know-your-customer data provider. Then, the computing device may process the first data to convert the first data into a third format and process the second data to convert the second data into the third format. The computing device may then store the processed first data and the processed second data in a distributed database comprising a plurality of clusters by storing, based on an identity of the first third-party data provider, a first portion of the first data as encrypted first data and by storing, based on an identity of the first third-party data provider, a second portion of the first data as tokenized data. The computing device may then generate, based on the processed first data and the processed second data in the distributed database, a relationship graph indicating a relationship between at least one entity indicated in the processed first data and at least one entity indicated in the processed second data. That generation process may involve determining, based on first properties of the at least one entity indicated in the processed first data and second properties of the at least one entity indicated in the processed second data, a relationship type between the at least one entity indicated in the processed first data and the at least one entity indicated in the processed second data and then storing, in a primary cluster of the plurality of clusters of the distributed database, the relationship graph, wherein the relationship graph indicates the relationship type. The computing device may then cause display, at a user computing device, of a graphical representation of at least a portion of the relationship graph. Later, the computing device may receive, after generating the relationship graph and from a third third-party data provider, third data in a fourth format. The computing device may then process the third data to convert the third data into the third format, store the processed third data in the distributed database, and update, based on the processed third data in the distributed database, the relationship graph. The computing device may detect a failure of the primary cluster of the plurality of clusters of the distributed database. In such a circumstance, and based on the failure of the primary cluster, the computing device may perform an automatic detach-and-promote failover process. That process may involve identifying a secondary cluster corresponding to the primary cluster, promoting the secondary cluster to a new primary cluster by removing one or more associations between the secondary cluster and the primary cluster and causing the new primary cluster to provide, to the user computing device, information associated with the updated relationship graph, and causing display, at the user computing device, based on the updated relationship graph, and using the information associated with the updated relationship graph stored by the new primary cluster, of an updated graphical representation of the at least the portion of the relationship graph.

The properties of the entities used to generate the relationship graph need not be identical. Along those lines, one advantage of the present disclosure is that the entities may be related even if they are not apparently related. For example, the first properties may indicate an organization, and the second properties may indicate a human being associated with the organization. As another example, the first properties may indicate a user, and the second properties may indicate a computing device associated with the user. This may extend to associating concepts like financial accounts to entities. For example, the first properties may comprise an organizational identifier, the second properties may comprise an identification of a financial account, and the generating the relationship graph may comprise causing the computing device to determine an association between the financial account and the organizational identifier.

The data may be stored in a manner that segregates secure and/or otherwise sensitive data. For example, the computing device may process the first data by causing the computing device to determine that at least a portion of the first data comprises sensitive data. In such a circumstance, the computing device may process the first data by causing the computing device to store the processed first data and the processed second data in the distributed database by causing the computing device to store the at least a portion of the first data in a secure portion of the distributed database.

Though received in a manner that suggests the data is different, the computing device may be capable of providing portions of different sets of data together. For example, the computing device may receive a request for information in the distributed database and may provide, in response to the request, at least a portion of the first data and at least a portion of the second data. Access to the stored data may be conditioned on authentication. For example, the computing device may provide the at least the portion of the first data and the at least the portion of the second data based on authenticating an originator of the request for information.

Corresponding methods, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
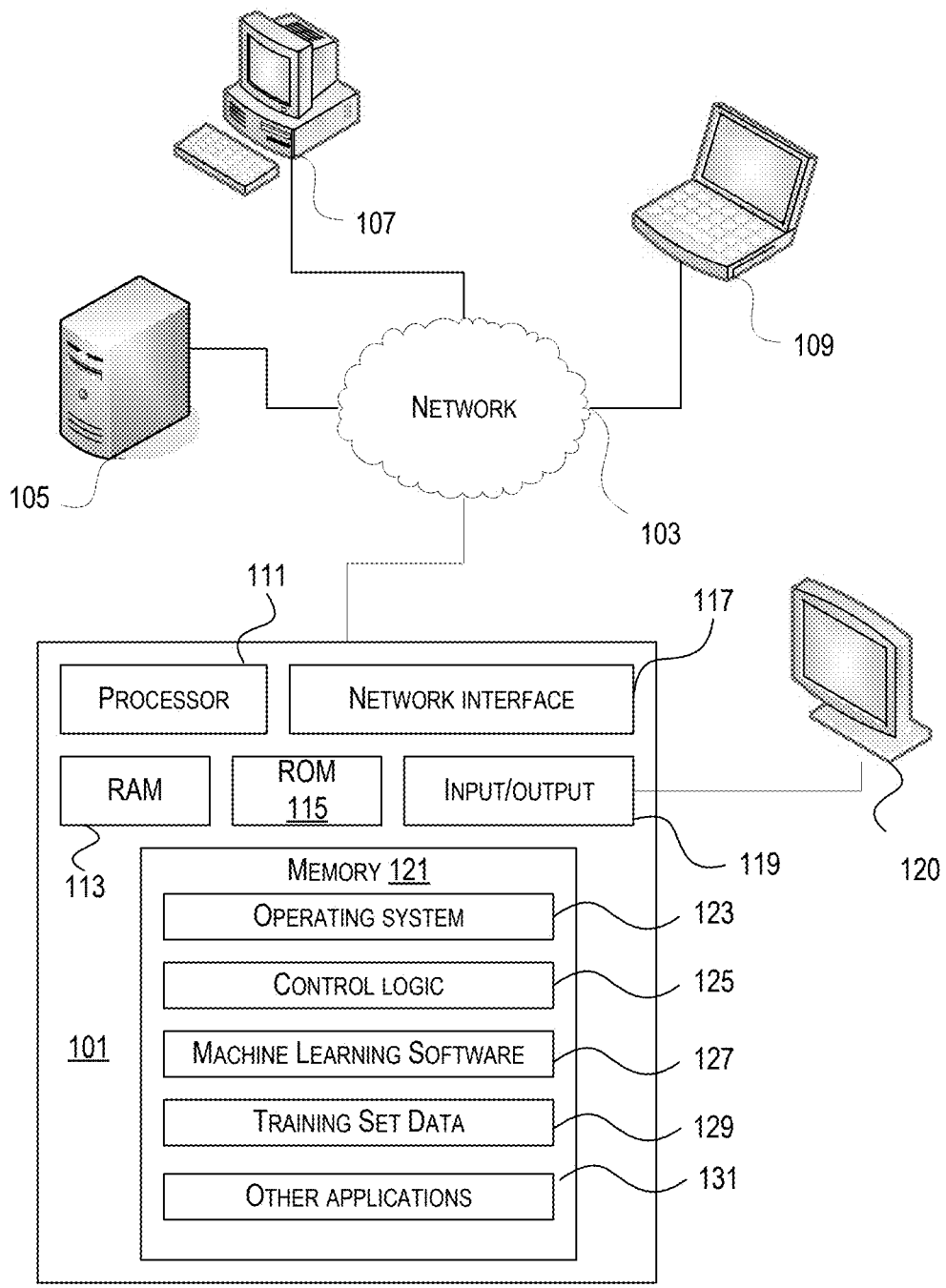
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, data may be received from a variety of sources, and that data might not be in the same or a similar format. This may present unique issues, as it may be desirable to identify relationships between entities in that data, but the data itself might be difficult to correlate for a variety of reasons. This problem can become particularly troublesome in view of distributed databases, where the failure of a cluster (particularly one tasked with handling one part of the data) can cause additional concerns with tracking relationships in data. Additional problems crop up when the volume of data and speed of that data is taken into consideration: for example, when new data is constantly incoming from various sources, there might not be an easy time to pause, analyze all of the data at once, and infer relationships. Similar issues crop up with respect to data security: after all, the constant influx of data can make it difficult to ensure that all secure data is maintained appropriately.

Aspects described herein remedy those and other issues by providing a holistic data management platform capable of ingesting data from a wide variety of sources and processing that data in a manner that provides resilient relationship graphs, even in circumstances where the data is formatted differently, where the data is received rapidly, and the like. As will be detailed more below, this process involves storing data separately (e.g., encrypted or tokenized as necessary), generating a relationship graph based on properties of entities indicated in the data, and providing that relationship graph as output. As updates to the data are received (e.g., as new data is received), then the relationship graph may be updated. Moreover, aspects described herein provide a failover process whereby primary cluster failure is remedied using a detach-and-promote process, whereby a second cluster is promoted and used to provide the relationship graph. This failover process, among other benefits, helps remedy the possibility that the relationship graph cannot keep up with the speed of data intake during the downtime of a primary cluster.

Aspects described herein improve the functioning of computers because they comprise a computer-implemented solution to a computer-rooted problem. The issue of vast quantities of data in different formats being received and used to generate relationship graphs is one rooted in computers, particularly where (as here) the data is received at high speeds/frequencies. Indeed, in many cases, aspects described herein might be deployed in circumstances where a variety of third-party data providers are providing new data almost every second, meaning that a constant stream of additional data (which might implicate changes to a relationship graph) might be flowing in rapidly. No human or collection of humans could even purport to handle this data volume. Moreover, the improvements described herein require computers and computing processes, and could not be performed by a human, whether mentally or otherwise. For example, the entire concept of a cluster failover process is not related to human mental processes.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, computing devices 101, 105, 107, 109, and others may operate in concert to provide parallel computing features in support of the operation of control logic 125 and/or machine learning software 127.

FIG. 1 also shows that the computing device 101 may comprise a Hardware Security Module (HSM) 132 and/or a Quantum Random Number Generator (QRNG) 133. The HSM 132 may comprise any computing module (e.g., one or more computer chips, attached cards, or the like) which may be capable of managing secrets, performing encryption and/or decryption, and/or otherwise performing security—and/or authentication-related functions. The HSM 132 may comprise, for instance, one or more secure cryptoprocessor chips which are capable of performing cryptographic operations. The QRNG 133 may comprise any computing module (e.g., one or more computer chips, attached cards, or the like) capable of generating a random number. Such a random number might be generated using quantum methods which permit the random number to have a high degree of entropy.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
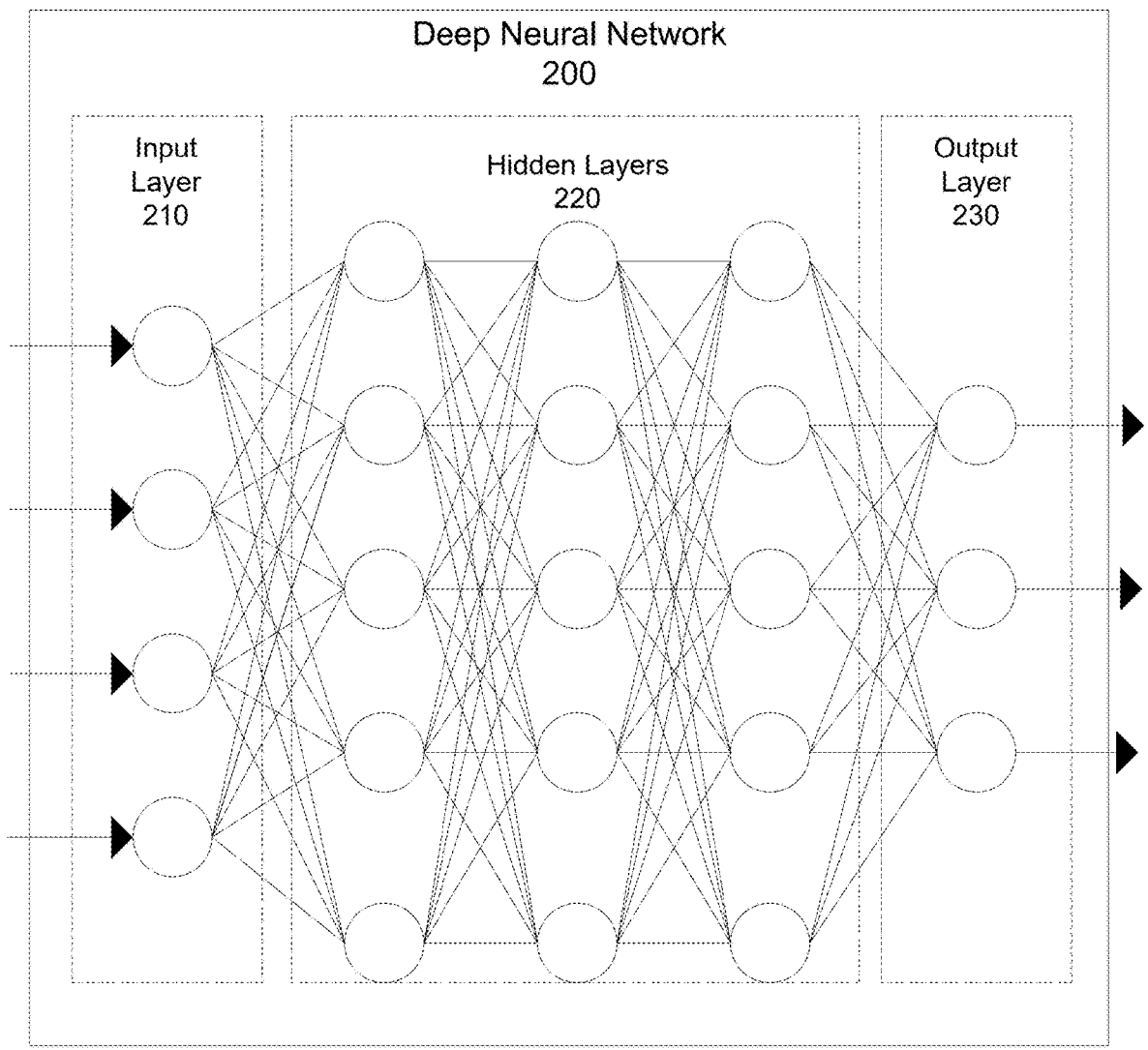
FIG. 2 depicts an example deep neural network architecture for a model according to one or more aspects of the disclosure.

FIG. 2 illustrates an example of a deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network architecture 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
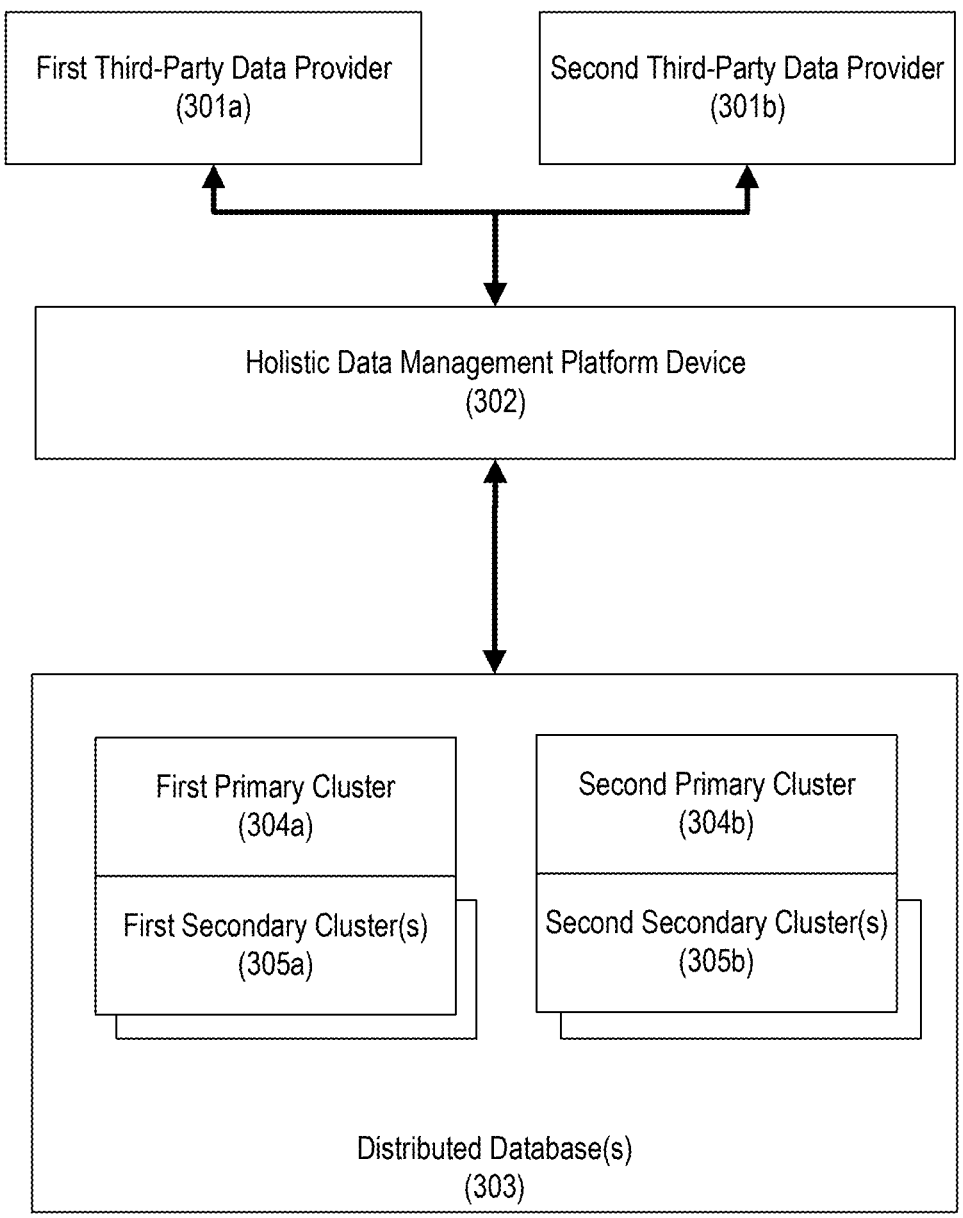
FIG. 3 depicts an illustrative system including a holistic data management platform device, third-party data providers, and one or more distributed databases.

FIG. 3 depicts an illustrative system 300 including a holistic data management platform device 302, third-party data providers such as a first third-party data provider 301*a* and a second third-party data provider 301*b*, and one or more distributed databases 303. All or portions of these devices may be a computing device, such as described above with respect to FIG. 1. The system 300 depicted in FIG. 3 may be implemented by an organization as part of using the holistic data management platform device 302 to receive data from various third-party data providers, process that data, store that data in distributed databases, generate relationship graphs, handle cluster failures, and the like. With that said, the system 300 is merely an example, and many different types of implementations may be used.

The holistic data management platform device 302 may comprise a computing device configured to receive data from third-party data providers (such as the first third-party data provider 301*a* and/or the second third-party data provider 301*b*), process and/or store the data in the one or more distributed databases 303, generate relationship graphs based on such data, provide those relationship graphs (e.g., to various other computing devices, such as user devices), update stored data and/or relationship graphs, handle failover processes in the event of a cluster failure in the one or more distributed databases, and the like. For example, the holistic data management platform device 302 may receive first data from the first third-party data provider 301*a*, process that data, and then store it (e.g., plain, as encrypted, and/or as tokenized) in the one or more distributed databases 303 such that it is accessible via one or more clusters of the one or more distributed databases 303. That data, along with other data (e.g., from the second third-party data provider), may be processed by the holistic data management platform device 302 to identify one or more relationships between entities in the data, which might be used to generate a relationship graph.

Third-party data providers, such as the first third-party data provider 301*a* and/or the second third-party data provider 301*b*, may be configured to collect, store, and/or transmit data. In many circumstances, these third-party data providers may be sources of a variety of types of information. For instance, the third-party data providers may comprise computer network logging systems (e.g., security monitoring solutions monitoring packet traffic), e-commerce websites (e.g., websites tracking purchases and browsing behavior), financial systems (e.g., electronic payment data), mobile devices (e.g., tracking application activity), and the like. In many circumstances, the data provided by these third-party data providers may be in a variety of different formats, arrive at different rates, and might generally be incompatible with one another (both technically and logically). For example, the first third-party data provider 301*a* may provide e-commerce data on a minute-by-minute basis and in an XML format, whereas the second third-party data provider 301*b* may provide summary data relating to financial transactions on a monthly basis. Though only two third-party data providers are shown in FIG. 3, a large quantity of such third-party data providers may exist, all providing large volumes of data at different rates and at different speeds. Along those lines, the holistic data management platform device 302 may receive gigabytes (if not hundreds of gigabytes or terabytes) of data on an hourly basis, all from different sources, in different formats, and intended for different purposes.

The one or more distributed databases 303 may comprise one or more databases configured to store data received from the holistic data management platform device 302. For example, the one or more distributed databases 303 may comprise one or more clusters (such as a first primary cluster 304*a*, one or more first secondary clusters 305*a*, a second primary cluster 304*b*, and one or more second secondary clusters 305*b*) which provide access to data. Those clusters may be distributed and redundant, such as in a cloud storage configuration. Examples of the one or more distributed databases 303 may include database solutions provided by Amazon Web Services, Inc. of Seattle, Washington, and/or the database solutions provided by Snowflake Inc. of Bozeman, Montana.

The clusters provided by the one or more distributed databases 303 may be arranged as a hierarchy. For example, as shown in FIG. 3, the one or more distributed databases 303 may comprise the first primary cluster 304*a*, the one or more first secondary clusters 305*a*, the second primary cluster 304*b*, and the one or more second secondary clusters 305*b*. In this manner, a primary cluster may be primarily tasked with servicing data requests (e.g., receiving queries, sending responses to those queries), whereas secondary clusters may be used to either service data requests in different geographical locations. Moreover, as will be described in greater detail below, aspects described herein may promote one or more secondary clusters to a primary cluster upon failure of a primary cluster, meaning that data may remain available.

Figure 4:
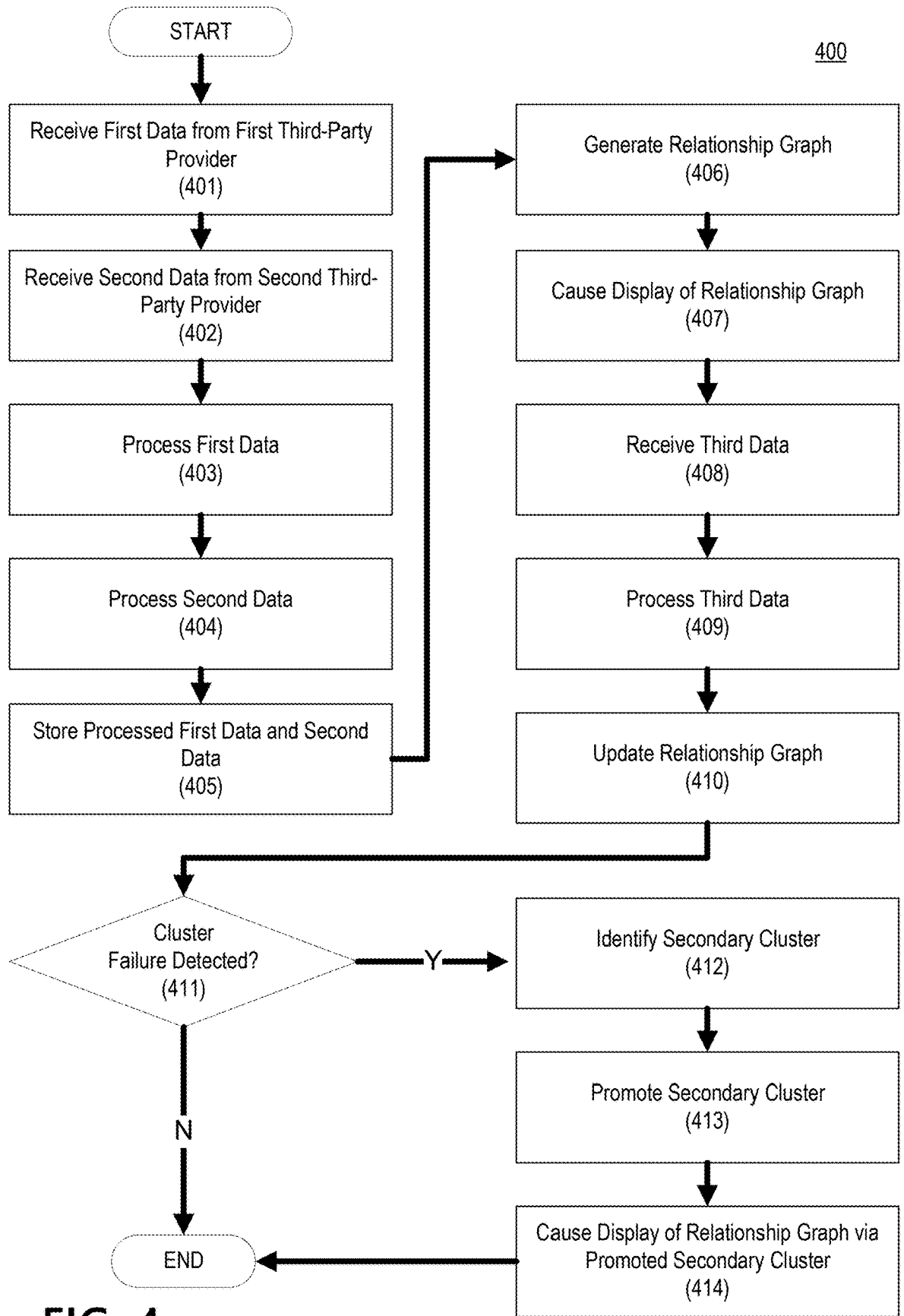
FIG. 4 is an illustrative flow chart comprising steps for providing a holistic data management platform.

FIG. 4 depicts a method 400 comprising steps for providing a holistic data management which may be performed by a computing device, such as any one of the devices described with respect to FIG. 1 and/or FIG. 2. The steps shown in FIG. 4 are illustrative, and may be re-arranged, omitted, and/or modified as desired. A computing device may comprise one or more processors and memory storing instructions that, when executed by the one or more processors, cause the performance of one or more of the steps depicted in FIG. 4. One or more non-transitory computer-readable media may store instructions that, when executed, cause the performance of one or more of the steps depicted in FIG. 4.

In step 401, a computing device may receive first data from a first third-party data provider. For example, the computing device may receive, from a first third-party data provider, first data (e.g., e-commerce information, computer security information, financial data) in a first format (e.g., XML data, MySQL data, tab-separated values).

In step 402, the computing device may receive second data from a second third-party data provider. For example, the computing device may receive, from a second third-party data provider, second data in a second format. This process may be the same or similar as step 401, albeit with respect to different data.

While FIG. 4 only describes receiving data twice, a wide variety of data may be received in a wide variety of formats and with various frequencies. As indicated earlier, practically speaking, the holistic data management platform device 302 may receive data from a large variety of sources at a high frequency. For example, some implementations of the holistic data management platform device 302 may receive data from dozens of different sources, often in real-time, and often at high volumes (e.g., gigabytes a day).

In step 403, the computing device may process the first data. Processing the data may comprise a wide variety of different steps. For instance, processing the first data may comprise modifying a format of the data, such as by converting the data from a tab-separated format to XML. For example, the computing device may process the first data to convert the first data into a third format. Processing the first data may additionally and/or alternatively comprise removing one or more portions of the data, such as by removing confidential and/or sensitive portions of the data. Processing the first data may additionally and/or alternatively comprise encrypting and/or tokenizing all or portions of the data, particularly where the data is particularly sensitive (e.g., contains personally identifying information (PII). Processing the first data may additionally and/or alternatively comprise adding metadata to the data, such as appending the data with information describing the origin of the data, the time the data was received, or the like. Processing the first data may additionally and/or alternatively comprise replacing column and/or field names with standardized field names, such as ensuring that all fields referring to a first name are titled "First Name" and, for example, not "first_name." "fname," or the like. Processing the first data may additionally and/or alternatively comprise querying another database and using results from the query to explain, append, and/or otherwise modify the received data.

In step 404, the computing device may process the second data. For example, the computing device may process the second data to convert the second data into the third format. This step may be the same or similar as step 403, albeit with respect to different data. Different forms of processing may be performed based on the origin of data, such that the first data and the second data need not be processed using the same or similar steps. For example, the holistic data management platform device 302 may maintain different processing rules for different third-party data providers.

Processing the data, whether as part of step 403, step 404, or otherwise, may comprise determining whether data is sensitive. As part of processing data, the computing device may determine that at least a portion of the first data comprises sensitive data. While in some cases the data might be tagged as secure (e.g., tagged with an indication that the data is secure), in other cases, the computing device may infer whether the data is secure based on the data itself. This inference process may comprise reviewing a format of the data, a column name corresponding to the data, and/or the identity of the third-party data provider that provided the data in order to infer whether the data is secure. In such a circumstance, the data may undergo special handling procedures. For example, as part of storing the data (discussed below), the sensitive data might be specially stored in a secure area, might be encrypted and/or tokenized before storage, or the like. As another example, the data might be deleted, particularly in circumstances where the data is not necessary for a particular intended use.

In step 405, the computing device may store the processed first data and the processed second data. This may comprise storage in a distributed database, such as the one or more distributed databases 303. For example, the computing device may store the processed first data and the processed second data in a distributed database comprising a plurality of clusters. This may comprise storing some data in an encrypted manner, some data in a tokenized manner, and other data without encryption and/or tokenization. For example, the computing device may store, based on an identity of the first third-party data provider, a first portion of the first data as encrypted first data and store, based on an identity of the first third-party data provider, a second portion of the first data as tokenized data.

As part of storing data, sensitive data may be stored differently from other data. This may include storing the sensitive data in a sensitive portion of the one or more distributed databases 303. For example, the computing device may, if it determines that at least a portion of the first data comprises sensitive data, store the at least a portion of the first data in a secure portion of the distributed database. That secure portion may be a separate set of storage devices (e.g., separate hard drives), an encrypted database on a shared server, and the like.

Once stored, the distributed databases may be caused to provide data in response to requests. In this manner, and in addition to relationship graphs generated based on the stored data (as discussed below), the holistic data management platform device 302 may provide access to the data based on queries received from various sources. For example, the computing device may receive a request for information in the distributed database and provide, in response to the request, at least a portion of the first data and at least a portion of the second data. Such provision of data might be conditioned on authentication of a user that provided the query based on authentication credentials that they provide with the query and/or separately from the query (e.g., before sending the query). For example, the computing device may provide the at least the portion of the first data and the at least the portion of the second data based on authenticating an originator of the request for information.

In step 406, the computing device may generate a relationship graph. A relationship graph may comprise an indication of the relationship between various entities indicated in the data received, processed, and stored in the one or more distributed databases 303. For example, the computing device may generate, based on the processed first data and the processed second data in the distributed database, a relationship graph indicating a relationship between at least one entity indicated in the processed first data and at least one entity indicated in the processed second data. In this manner, the relationship graph may be usable to draw connections between entities that might otherwise not be associated in the data. To generate such a relationship graph, the computing device may determine, based on first properties of the at least one entity indicated in the processed first data and second properties of the at least one entity indicated in the processed second data, a relationship type between the at least one entity indicated in the processed first data and the at least one entity indicated in the processed second data. For example, the computing device may identify that one entity is a company and another entity is an employee, that one entity is a computing device and that the other entity is a user of the computing device, that one entity is an e-commerce account and the other entity is a user of the e-commerce account, or the like. Then, the computing device may store, in a primary cluster of the plurality of clusters of the distributed database, the relationship graph, wherein the relationship graph indicates the relationship type. In this manner, a distributed database such as the one or more distributed databases 303 might store not merely data received from various third-party data providers, but might also store data indicating associations between different entities in the data, even if those entities were not correlated before.

As part of generating a relationship graph, machine learning techniques may be used to determine relationships between entities. A trained machine learning model may be generated using training data indicating a variety of connections between entities in data. For instance, the training data may indicate that user accounts sometimes are in a "firstname_lastname" format—that is, for example, the training data may comprise a connection between the user "John Smith" and the username "john_smith." As another example, the training data may indicate that computing devices with identifiers of a certain format are associated with a particular company: for example, the training data may provide various indications of computing devices with the identifier "ABC_1," "ABC_2," and "ABC_3," all indicating that the devices are associated with the company "ABC Ltd." The trained machine learning model may then be provided input data indicating two or more entities, and the trained machine learning may provide output data indicating a likelihood that the two or more entities are related. In some cases, the machine learning model might be configured to identify a relationship type as part of its output, such as an indication regarding whether the two entities are in a company/employee relationship, a device/device owner relationship, or the like. Such a trained machine learning model may thereby be used to indicate a prediction as to whether various entities are related, and might be run repeatedly to test various possible relationships.

Additionally and/or alternatively, categorization machine learning models may be used. A machine learning model may be trained using similar training data as described above; however, the machine learning model might instead be configured to categorize large quantities of entities into different categories (e.g., each corresponding to a different grouping of entities). In such an example, the output may indicate groupings of various entities into two or more categories.

The properties used to determine a relationship and/or relationship type may vary. For example, the first properties may indicate an organization, and the second properties may indicate a human being associated with the organization. As another example, the first properties may comprise an organizational identifier, the second properties may comprise an identification of a financial account, and step 406 may comprise determining an association between the financial account and the organizational identifier.

The relationships between two entities may vary. Some relationships may comprise a relationship between an employer and employee. Some relationships may comprise a relationship between a device and an owner and/or user of the device. Some relationships may comprise a relationship between an account (e.g., a website account, a financial account) and a user of the account. A wide variety of relationships may exist, and it may be desirable to flexibly account for such a wide variety so as to reflect unexpected associations that might arise given the variety of data received from the third-party data providers.

In step 407, the computing device may cause display of the relationship graph. This step may comprise causing a user device, such as one of the devices depicted with respect to FIG. 1, to display a user interface comprising all or portions of the relationship graph. For example, the computing device may cause display, at a user computing device, of a graphical representation of at least a portion of the relationship graph. The display of the relationship graph may be periodically updated based on updated data received from various third-party data providers, such that the display of the relationship graph may change over time to reflect the addition of new relationships, the removal of relationships, and the like.

Following on the above, and as a brief introduction to step 408, step 409, and step 410, one of the many advantages of the processes described herein is that a relationship graph may be regularly updated to reflect evolving relationships as they are detected in the data received from third-party data providers. This may include adding new relationships between entities based on new data, removing relationships between entities based on new data, adjusting relationships to a new relationship type based on new data, and the like.

In step 408, the computing device may receive third data. For example, the computing device may receive, after generating the relationship graph and from a third third-party data provider, third data in a fourth format. This process may be the same or similar as the processes described with respect to step 401 and/or step 402, albeit with respect to new data.

In step 409, the computing device may process the third data. For example, the computing device may process the third data to convert the third data into the third format. This step may include storing the processed third data in the distributed database. This process may be the same or similar as step 403 and/or step 404, albeit with respect to the new data received in step 408.

In step 410, the computing device may update the relationship graph. The relationship graph may be updated based on the data received and processed in step 408 and/or step 409. For example, the computing device may update, based on the processed third data in the distributed database, the relationship graph. This may include adding new relationships between entities based on the third data, removing relationships between entities based on the third data, adjusting relationships to a new relationship type based on the third data, or the like.

As an introduction to step 411, step 412, step 413, and step 414, the provisioning of a relationship graph may be reliant on the availability of data, such as via the one or more distributed databases 303. After all, the relationships (whether via clustering, individual analysis, or the like) may be reliant on the availability of large quantities of data, and even a fraction of that data becoming unavailable, even temporarily, might significantly limit the accuracy of the relationship graph. In turn, the downtime of the one or more distributed databases 303 may have negative implications for the relationship graph.

In step 411, the computing device may determine whether a cluster failure has occurred. A cluster failure might be the total or partial unavailability of one or more primary clusters of the one or more distributed databases 303, such as the first primary cluster 304a and/or the second primary cluster 304b. For example, the computing device may detect a failure of the primary cluster of the plurality of clusters of the distributed database. Such detection may comprise determining that a server corresponding to the primary cluster is online, identifying that a primary cluster has not communicated with the computing device within a period of time, or the like. If a cluster failure has occurred, the method 400 may proceed to step 412. Otherwise, the method 400 may end.

In step 412, the computing device may identify a secondary cluster. The secondary cluster may correspond to the primary cluster. For example, the computing device may, based on the failure of the primary cluster, perform an automatic detach-and-promote failover process by first identifying a secondary cluster corresponding to the primary cluster. For instance, if the first primary cluster 304a fails, then at least one of the one or more first secondary clusters 305a may be identified. As another example, if the second primary cluster 304b fails, then at least one of the one or more second secondary clusters 305b may be identified. The identification might be based on data stored by the primary cluster and/or the secondary cluster. For example, a secondary cluster might be identified based on determining that it stores the same or similar data as the primary cluster.

In step 413, the computing device may promote the identified secondary cluster. Promoting the secondary cluster may comprise assigning the secondary cluster a primary status and making it responsible for data requests in lieu of the previous primary cluster. For example, the computing device may, based on the failure of the primary cluster, perform an automatic detach-and-promote failover process by promoting the secondary cluster to a new primary cluster by removing one or more associations between the secondary cluster and the primary cluster and causing the new primary cluster to provide, to the user computing device, information associated with the updated relationship graph.

In step 414, the computing device may cause display of the relationship graph via the promoted secondary cluster. For example, the computing device may cause display, at the user computing device, based on the updated relationship graph, and using the information associated with the updated relationship graph stored by the new primary cluster, of an updated graphical representation of the at least the portion of the relationship graph.

Figure 5:
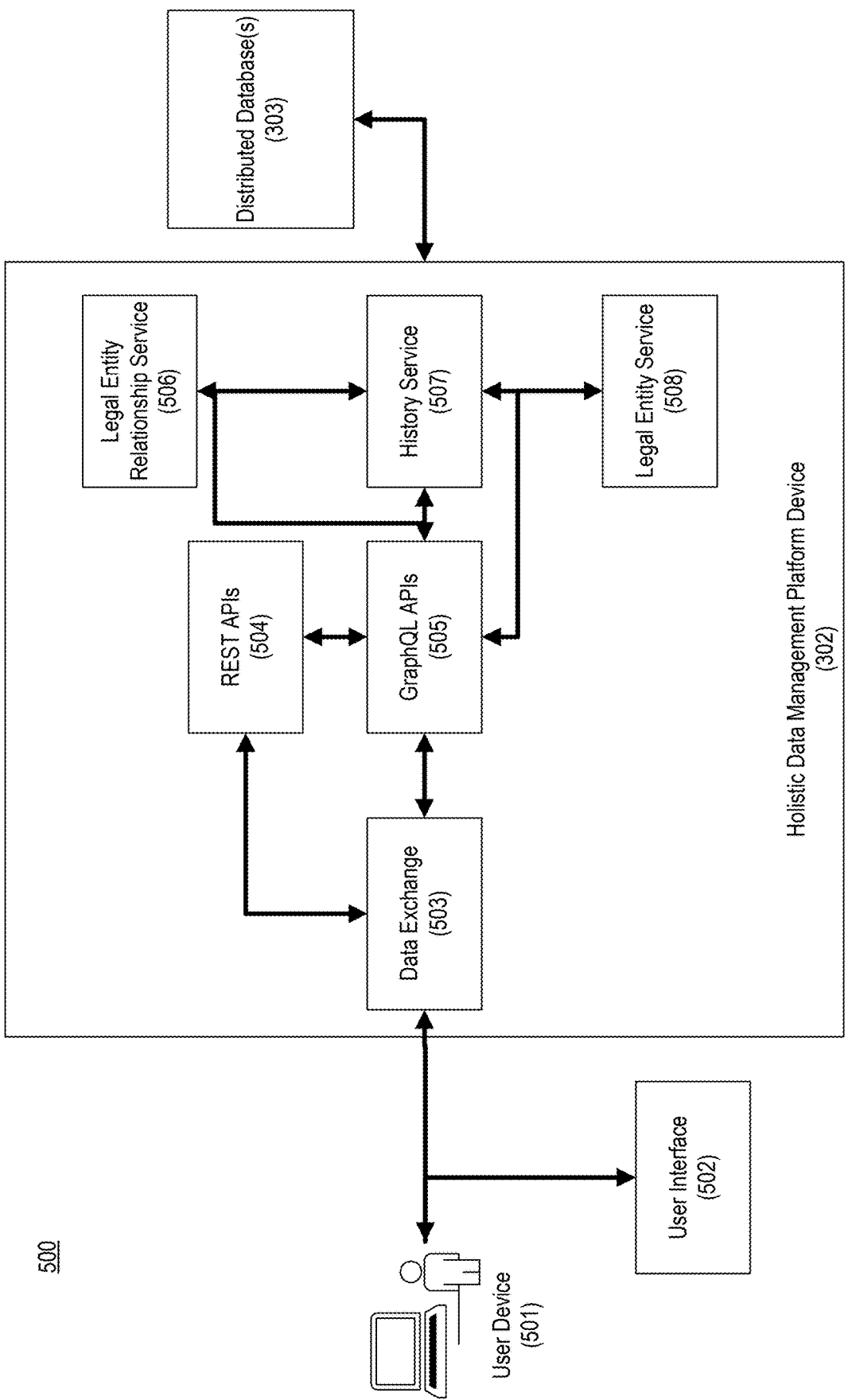
FIG. 5 depicts an illustrative system including various components of a holistic data management platform device.

FIG. 5 depicts an illustrative system 500 including various illustrative components of the holistic data management platform device 302. The system 500 is one example of how an organization might implement the holistic data management platform device 302 in a circumstance where, for example, REST APIs are used, GraphQL APIs are used, and in a circumstance where the holistic data management platform device 302 is focused on legal entity relationships (e.g., relationships between corporate entities and employees). A user device 501 may communicate, via a user interface 502, with a data exchange platform 503 of the holistic data management platform device 302. That data exchange platform 503 may be capable of receiving data requests (e.g., for data from the one or more distributed databases 303, for relationship graphs) and providing responses to those data requests (e.g., by sending responses directly to the user device 501 and/or via the user interface 502). To perform such a process, the data exchange platform 503 may use REST APIs 504 and/or GraphQL APIs 505 to request and/or retrieve data from one or more of a legal entity relationship service 506, a history service 507, a legal entity service 508, and/or one or more of the distributed databases 303. The legal entity relationship service 506 may be configured to determine and/or maintain relationships between different entities (e.g., as part of step 406 of FIG. 4). The history service 507 may maintain information regarding a history of data received by various third-party data providers. The legal entity service 508 may be configured to maintain a list of legal entities, such as might be used to identify associations (e.g., by the legal entity relationship service 506).

Figure 6:
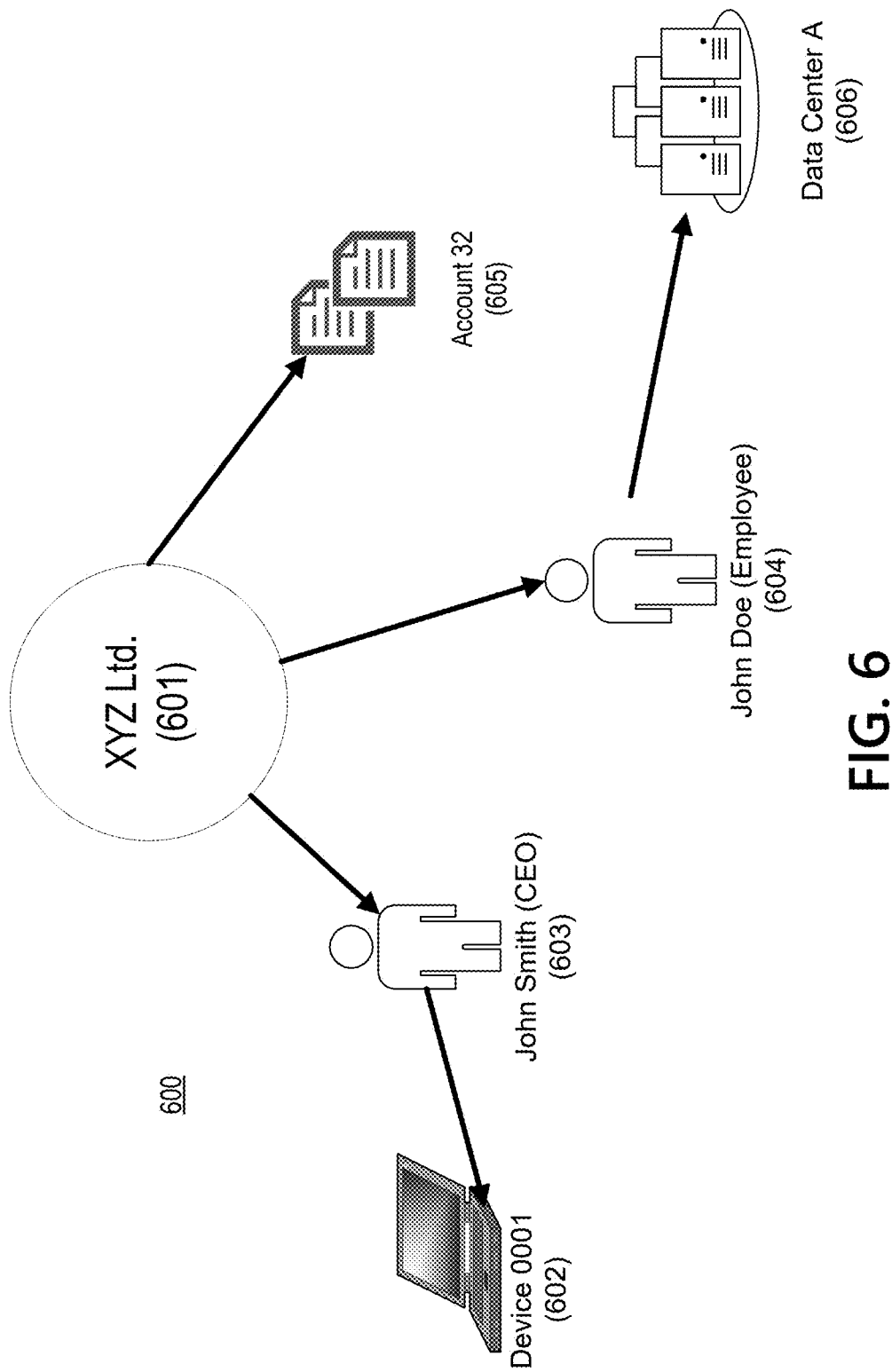
FIG. 6 depicts an example of a relationship graph.

FIG. 6 depicts an example of a relationship graph 600. As shown in this relationship graph, a legal entity 601, XYZ Ltd., is associated with a variety of other entities, including a computing device 602, an indication of user John Smith 603, an indication of user John Doe 604, and an account 605. Moreover, the relationship graph 600 indicates that the indication of the user John Doe 604 is associated with a data center 606. The relationship graph 600 is merely an example, and many different relationship graphs may be generated in accordance with the concepts described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device configured to provide a holistic data management platform, the computing device comprising:
  one or more processors; and
  memory storing instructions that, when executed by the one or more processors, cause the computing device to:
    receive, from a first third-party data provider, first data in a first format;
    receive, from a second third-party data provider, second data in a second format;
    process the first data to convert the first data into a third format;
    process the second data to convert the second data into the third format;
    store the processed first data and the processed second data in a distributed database comprising a plurality of clusters by:
      storing, based on an identity of the first third-party data provider, a first portion of the first data as encrypted first data; and storing, based on an identity of the first third-party data provider, a second portion of the first data as tokenized data;

generate, based on the processed first data and the processed second data in the distributed database, a relationship graph indicating a relationship between at least one entity indicated in the processed first data and at least one entity indicated in the processed second data by:

determining, based on first properties of the at least one entity indicated in the processed first data and second properties of the at least one entity indicated in the processed second data, a relationship type between the at least one entity indicated in the processed first data and the at least one entity indicated in the processed second data; and storing, in a primary cluster of the plurality of clusters of the distributed database, the relationship graph, wherein the relationship graph indicates the relationship type;

cause display, at a user computing device, of a graphical representation of at least a portion of the relationship graph;

receive, after generating the relationship graph and from a third third-party data provider, third data in a fourth format;

process the third data to convert the third data into the third format;

store the processed third data in the distributed database;

update, based on the processed third data in the distributed database, the relationship graph;

detect a failure of the primary cluster of the plurality of clusters of the distributed database;

based on the failure of the primary cluster, perform an automatic detach-and-promote failover process by:

identifying a secondary cluster corresponding to the primary cluster;

promoting the secondary cluster to a new primary cluster by removing one or more associations between the secondary cluster and the primary cluster and causing the new primary cluster to provide, to the user computing device, information associated with the updated relationship graph; and causing display, at the user computing device, based on the updated relationship graph, and using the information associated with the updated relationship graph stored by the new primary cluster, of an updated graphical representation of the at least the portion of the relationship graph.

2. The computing device of claim 1, wherein the first properties indicate an organization, and wherein the second properties indicate a human being associated with the organization.

3. The computing device of claim 2, wherein the first properties comprise an organizational identifier, wherein the second properties comprise an identification of a financial account, and wherein the instructions, when executed by the one or more processors, cause the computing device to generate the relationship graph by causing the computing device to determine an association between the financial account and the organizational identifier.

4. The computing device of claim 1, wherein the instructions, when executed by the one or more processors, cause the computing device to process the first data by causing the computing device to determine that at least a portion of the first data comprises sensitive data, and wherein the instructions, when executed by the one or more processors, cause the computing device to store the processed first data and the processed second data in the distributed database by causing the computing device to store the at least a portion of the first data in a secure portion of the distributed database.

5. The computing device of claim 1, wherein the instructions, when executed by the one or more processors, cause the computing device to:

receive a request for information in the distributed database; and provide, in response to the request, at least a portion of the first data and at least a portion of the second data.

6. The computing device of claim 5, wherein the instructions, when executed by the one or more processors, cause the computing device to provide the at least the portion of the first data and the at least the portion of the second data based on authenticating an originator of the request for information.

7. The computing device of claim 1, wherein the first third-party data provider comprises a customer relations management platform, and wherein the second third-party data provider comprises a know-your-customer data provider.

8. A method configured to provide a holistic data management platform, the method comprising:

receiving, from a first third-party data provider, first data in a first format;

receiving, from a second third-party data provider, second data in a second format;

processing the first data to convert the first data into a third format;

processing the second data to convert the second data into the third format;

storing the processed first data and the processed second data in a distributed database comprising a plurality of clusters by:

storing, based on an identity of the first third-party data provider, a first portion of the first data as encrypted first data; and storing, based on an identity of the first third-party data provider, a second portion of the first data as tokenized data;

generating, based on the processed first data and the processed second data in the distributed database, a relationship graph indicating a relationship between at least one entity indicated in the processed first data and at least one entity indicated in the processed second data by:

determining, based on first properties of the at least one entity indicated in the processed first data and second properties of the at least one entity indicated in the processed second data, a relationship type between the at least one entity indicated in the processed first data and the at least one entity indicated in the processed second data; and storing, in a primary cluster of the plurality of clusters of the distributed database, the relationship graph, wherein the relationship graph indicates the relationship type;

causing display, at a user computing device, of a graphical representation of at least a portion of the relationship graph;

receiving, after generating the relationship graph and from a third third-party data provider, third data in a fourth format;

processing the third data to convert the third data into the third format;
store the processed third data in the distributed database;
updating, based on the processed third data in the distributed database, the relationship graph;
detecting a failure of the primary cluster of the plurality of clusters of the distributed database;
based on the failure of the primary cluster, performing an automatic detach-and-promote failover process by:
  identifying a secondary cluster corresponding to the primary cluster;
  promoting the secondary cluster to a new primary cluster by removing one or more associations between the secondary cluster and the primary cluster and causing the new primary cluster to provide, to the user computing device, information associated with the updated relationship graph; and
  causing display, at the user computing device, based on the updated relationship graph, and using the information associated with the updated relationship graph stored by the new primary cluster, of an updated graphical representation of the at least the portion of the relationship graph.

9. The method of claim 8, wherein the first properties indicate an organization, and wherein the second properties indicate a human being associated with the organization.

10. The method of claim 9, wherein the first properties comprise an organizational identifier, wherein the second properties comprise an identification of a financial account, and wherein the generating the relationship graph comprises determining an association between the financial account and the organizational identifier.

11. The method of claim 8, wherein the processing the first data comprises determining that at least a portion of the first data comprises sensitive data, and wherein the storing the processed first data and the processed second data in the distributed database comprises storing the at least a portion of the first data in a secure portion of the distributed database.

12. The method of claim 8, further comprising:
  receive a request for information in the distributed database; and
  provide, in response to the request, at least a portion of the first data and at least a portion of the second data.

13. The method of claim 12, wherein the providing the at least the portion of the first data and the at least the portion of the second data is based on authenticating an originator of the request for information.

14. The method of claim 8, wherein the first third-party data provider comprises a customer relations management platform, and wherein the second third-party data provider comprises a know-your-customer data provider.

15. One or more non-transitory computer-readable media storing instructions that, when executed by one or more processors of a computing device, cause the computing device to:
  receive, from a first third-party data provider, first data in a first format;
  receive, from a second third-party data provider, second data in a second format;
  process the first data to convert the first data into a third format;
  process the second data to convert the second data into the third format;
  store the processed first data and the processed second data in a distributed database comprising a plurality of clusters by:
    storing, based on an identity of the first third-party data provider, a first portion of the first data as encrypted first data; and
    storing, based on an identity of the first third-party data provider, a second portion of the first data as tokenized data;
  generate, based on the processed first data and the processed second data in the distributed database, a relationship graph indicating a relationship between at least one entity indicated in the processed first data and at least one entity indicated in the processed second data by:
    determining, based on first properties of the at least one entity indicated in the processed first data and second properties of the at least one entity indicated in the processed second data, a relationship type between the at least one entity indicated in the processed first data and the at least one entity indicated in the processed second data; and
    storing, in a primary cluster of the plurality of clusters of the distributed database, the relationship graph, wherein the relationship graph indicates the relationship type;
  cause display, at a user computing device, of a graphical representation of at least a portion of the relationship graph;
  receive, after generating the relationship graph and from a third third-party data provider, third data in a fourth format;
  process the third data to convert the third data into the third format;
  store the processed third data in the distributed database;
  update, based on the processed third data in the distributed database, the relationship graph;
  detect a failure of the primary cluster of the plurality of clusters of the distributed database;
  based on the failure of the primary cluster, perform an automatic detach-and-promote failover process by:
    identifying a secondary cluster corresponding to the primary cluster;
    promoting the secondary cluster to a new primary cluster by removing one or more associations between the secondary cluster and the primary cluster and causing the new primary cluster to provide, to the user computing device, information associated with the updated relationship graph; and
    causing display, at the user computing device, based on the updated relationship graph, and using the information associated with the updated relationship graph stored by the new primary cluster, of an updated graphical representation of the at least the portion of the relationship graph.

16. The one or more non-transitory computer-readable media of claim 15, wherein the first properties indicate an organization, and wherein the second properties indicate a human being associated with the organization.

17. The one or more non-transitory computer-readable media of claim 16, wherein the first properties comprise an organizational identifier, wherein the second properties comprise an identification of a financial account, and wherein the instructions, when executed by the one or more processors, cause the computing device to generate the relationship graph by causing the computing device to determine an association between the financial account and the organizational identifier.

18. The one or more non-transitory computer-readable media of claim 15, wherein the instructions, when executed by the one or more processors, cause the computing device to process the first data by causing the computing device to determine that at least a portion of the first data comprises sensitive data, and wherein the instructions, when executed by the one or more processors, cause the computing device to store the processed first data and the processed second data in the distributed database by causing the computing device to store the at least a portion of the first data in a secure portion of the distributed database.

19. The one or more non-transitory computer-readable media of claim 15, wherein the instructions, when executed by the one or more processors, cause the computing device to:

receive a request for information in the distributed database; and provide, in response to the request, at least a portion of the first data and at least a portion of the second data.

20. The one or more non-transitory computer-readable media of claim 19, wherein the instructions, when executed by the one or more processors, cause the computing device to provide the at least the portion of the first data and the at least the portion of the second data based on authenticating an originator of the request for information.

\* \* \* \* \*